(12) United States Patent
Vasseur et al.

(10) Patent No.: US 12,058,010 B2
(45) Date of Patent: *Aug. 6, 2024

(54) ADAPTIVE STRESS TESTING OF SD-WAN TUNNELS FOR WHAT-IF SCENARIO MODEL TRAINING

(71) Applicant: Cisco Technology, Inc., San Jose, CA (US)

(72) Inventors: Jean-Philippe Vasseur, Saint Martin d'Uriage (FR); Grégory Mermoud, Venthône (CH); Pierre-André Savalle, Rueil-Malmaison (FR); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/873,414

(22) Filed: Jul. 26, 2022

(65) Prior Publication Data
US 2022/0360502 A1 Nov. 10, 2022

Related U.S. Application Data

(63) Continuation of application No. 16/425,093, filed on May 29, 2019, now Pat. No. 11,411,838.

(51) Int. Cl.
H04L 41/5003 (2022.01)
G06N 20/00 (2019.01)
(Continued)

(52) U.S. Cl.
CPC ......... *H04L 41/5003* (2013.01); *G06N 20/00* (2019.01); *H04L 41/0896* (2013.01); *H04L 41/142* (2013.01); *H04L 41/147* (2013.01)

(58) Field of Classification Search
None
See application file for complete search history.

(56) References Cited

U.S. PATENT DOCUMENTS 7,606,895 B1 10/2009 Dini et al.
8,706,861 B2 * 4/2014 Menezes ................. H04L 47/83
709/229

(Continued)

OTHER PUBLICATIONS

Majda, "Fundamental Limitations of Ad Hoc Linear and Quadratic Multi-Level Regression Models for Physical Systems", vol. 17, No. 4, pp. 1333-1363, Jun. 2012 [retrieved on Jun. 20, 2020]. Retrieved from the Internet :<URL: http://citeseerx.ist.psu.edu/viewdoc/download?doi=10.1.1.369.6985&rep1&type=pdf> (Year: 2012).

(Continued)

*Primary Examiner* — Thu V Nguyen
*Assistant Examiner* — Dae Kim
(74) *Attorney, Agent, or Firm* — BEHMKE INNOVATION GROUP LLC; James M. Behmke; James J. Wong

(57) ABSTRACT

In one embodiment, a service in a network computes an expected information gain associated with rerouting traffic from a first tunnel onto a backup tunnel in the network. The service initiates, based on the expected information gain, rerouting of the traffic from the first tunnel onto the backup tunnel. The service obtains performance measurements for the traffic rerouted onto the backup tunnel. The service uses the performance measurements to train a machine learning model to predict whether rerouting traffic from the first tunnel onto the backup tunnel will satisfy a service level agreement (SLA) of the traffic.

18 Claims, 10 Drawing Sheets

(51) Int. Cl.
*H04L 41/0896* (2022.01)
*H04L 41/142* (2022.01)
*H04L 41/147* (2022.01)

(56) References Cited

U.S. PATENT DOCUMENTS

| | | |
|---|---|---|
| 9,495,395 B2 | 11/2016 | Chan et al. |
| 9,654,361 B2 | 5/2017 | Vasseur et al. |
| 10,075,390 B2 | 9/2018 | Karthikeyan et al. |
| 10,558,923 B1 | 2/2020 | Kethapadi |
| 10,581,736 B1 | 3/2020 | Choudhury |
| 2007/0121507 A1 | 5/2007 | Manzalini |
| 2014/0341042 A1 | 11/2014 | Racz |
| 2015/0222557 A1 | 8/2015 | Bhattacharya |
| 2016/0219070 A1 | 7/2016 | Vasseur |
| 2017/0279832 A1 | 9/2017 | Di Pietro |
| 2018/0146007 A1* | 5/2018 | Cruz Mota ......... H04L 63/1416 |
| 2018/0159755 A1 | 6/2018 | Dasgupta et al. |
| 2019/0274070 A1 | 9/2019 | Hughes |
| 2020/0134394 A1 | 4/2020 | Teshome |
| 2020/0296023 A1 | 9/2020 | Kumar |

OTHER PUBLICATIONS

Choudhury et al., "Two Use Cases of Machine Learning for SDN-Enabled IP/Optical Networks: Traffic Matrix Prediction and Optical Path Performance Prediction", arXiv.org, Jun. 12, 2018 [retrieved on Mar. 23, 2021]. Retrieved from the Internet: <URL: https://arxiv.org/abs/1804.07433> (Year: 2018).

* cited by examiner

ADAPTIVE STRESS TESTING OF SD-WAN TUNNELS FOR WHAT-IF SCENARIO MODEL TRAINING

RELATED APPLICATION

This application is a continuation of U.S. patent application Ser. No. 16/425,093, filed on May 29, 2019, entitled "ADAPTIVE STRESS TESTING OF SD-WAN TUNNELS FOR WHAT-IF SCENARIO MODEL TRAINING" by Vasseur et al., the entire contents of which are incorporated by reference herein.

TECHNICAL FIELD

The present disclosure relates generally to computer networks, and, more particularly, to adaptive stress testing of software-defined wide area network (SD-WAN) tunnels for what-if scenario model training.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs.

Failure detection in a network has traditionally been reactive, meaning that the failure must first be detected before rerouting the traffic along a secondary (backup) path. In general, failure detection leverages either explicit signaling from the lower network layers or using a keep-alive mechanism that sends probes at some interval T that must be acknowledged by a receiver (e.g., a tunnel tail-end router). Typically, SD-WAN implementations leverage the keep-alive mechanisms of Bidirectional Forwarding Detection (BFD), to detect tunnel failures and to initiate rerouting the traffic onto a backup (secondary) tunnel, if such a tunnel exits. While this approach is somewhat effective at mitigating tunnel failures in an SD-WAN, reactive failure detection is also predicated on a failure first occurring. This means that traffic will be affected by the failure, until the traffic is moved to another tunnel.

With the recent evolution of machine learning, predictive failure detection and proactive routing in an SD-WAN now becomes possible through the use of machine learning techniques. To do so, the routing mechanism may need to address various what-if scenarios. Underlying these scenarios is the question "what would happen to X, if Y occurs?" For example, before rerouting traffic onto a backup tunnel, the router may need to assess whether the backup tunnel would be able to meet the service level agreement (SLA) of the rerouted traffic, while also accounting for the extra overhead that the rerouted traffic would have on that tunnel. However, training a model to address what-if scenarios in the context of SD-WANs is quite difficult, as the complexity and system dynamics of SD-WANs make simulations all but impossible to implement.

DESCRIPTION OF EXAMPLE EMBODIMENTS

Overview

Figure 1A:
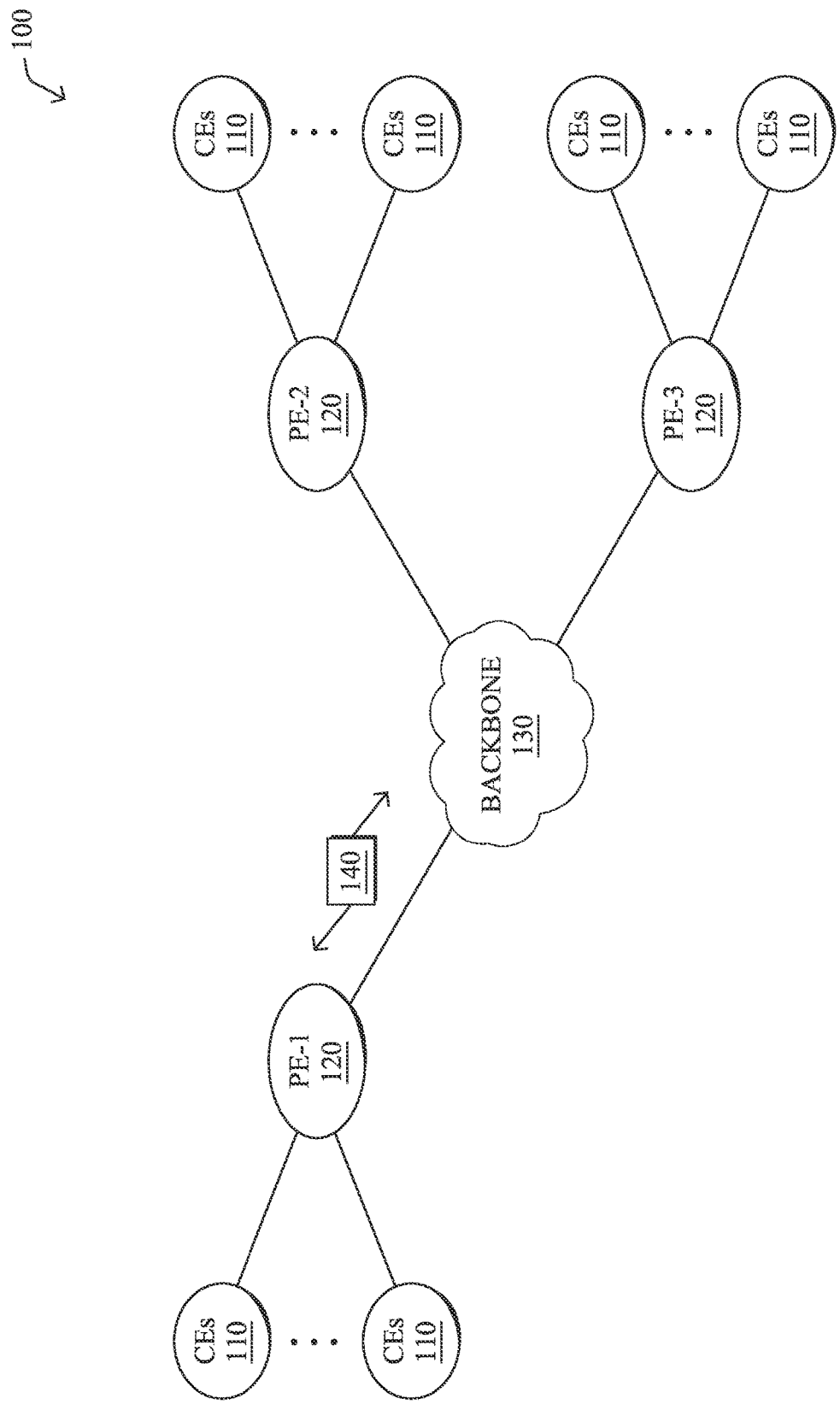
FIGS. 1A-1B illustrate an example communication network.

According to one or more embodiments of the disclosure, a service in a network computes an expected information gain associated with rerouting traffic from a first tunnel onto a backup tunnel in the network. The service initiates, based on the expected information gain, rerouting of the traffic from the first tunnel onto the backup tunnel. The service obtains performance measurements for the traffic rerouted onto the backup tunnel. The service uses the performance measurements to train a machine learning model to predict whether rerouting traffic from the first tunnel onto the backup tunnel will satisfy a service level agreement (SLA) of the traffic.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
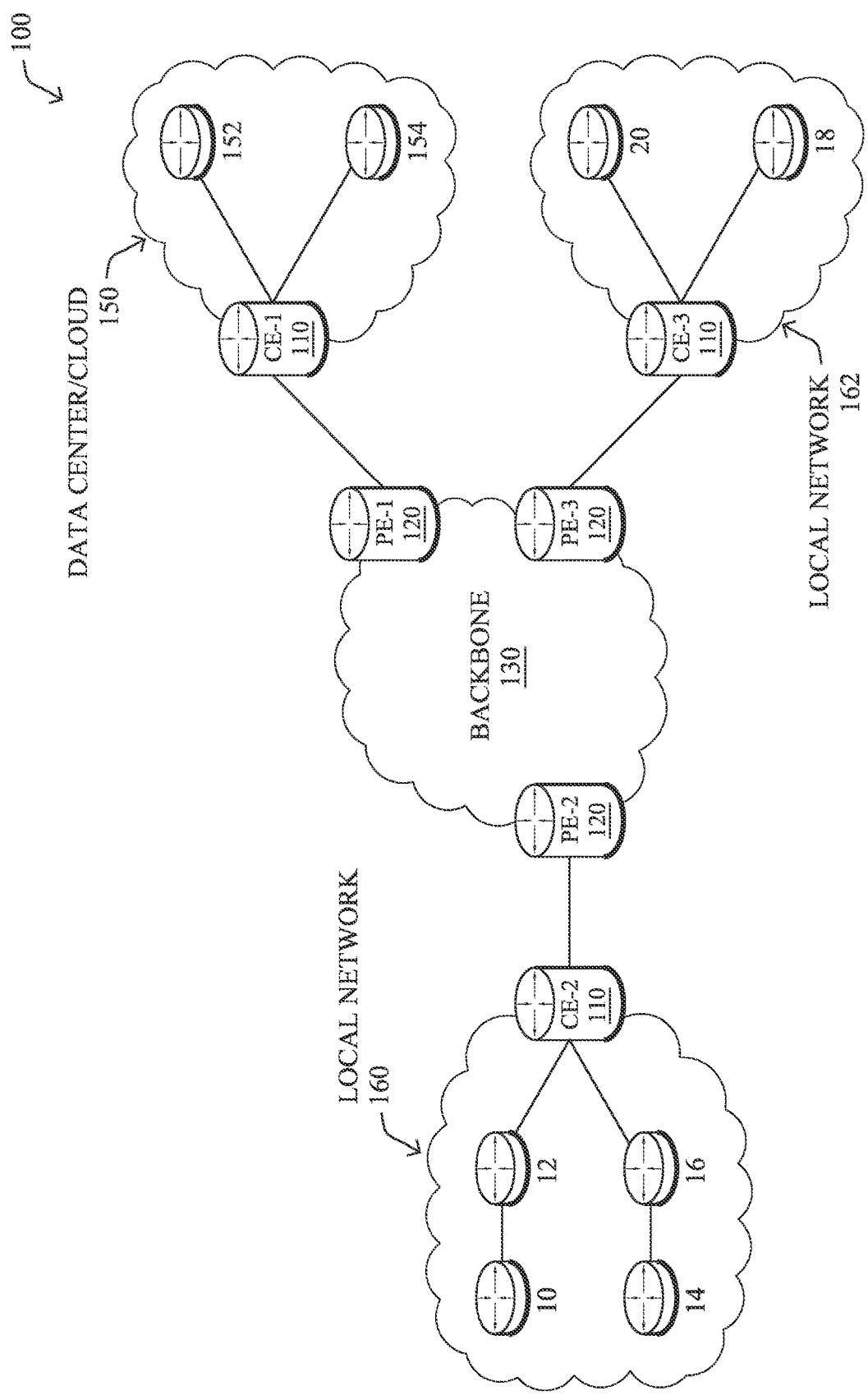

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud 150 on top of the various underlying connections. Another feature of SD-WAN is centralized management by a supervisory service that can monitor and adjust the various connections, as needed.

Figure 2:
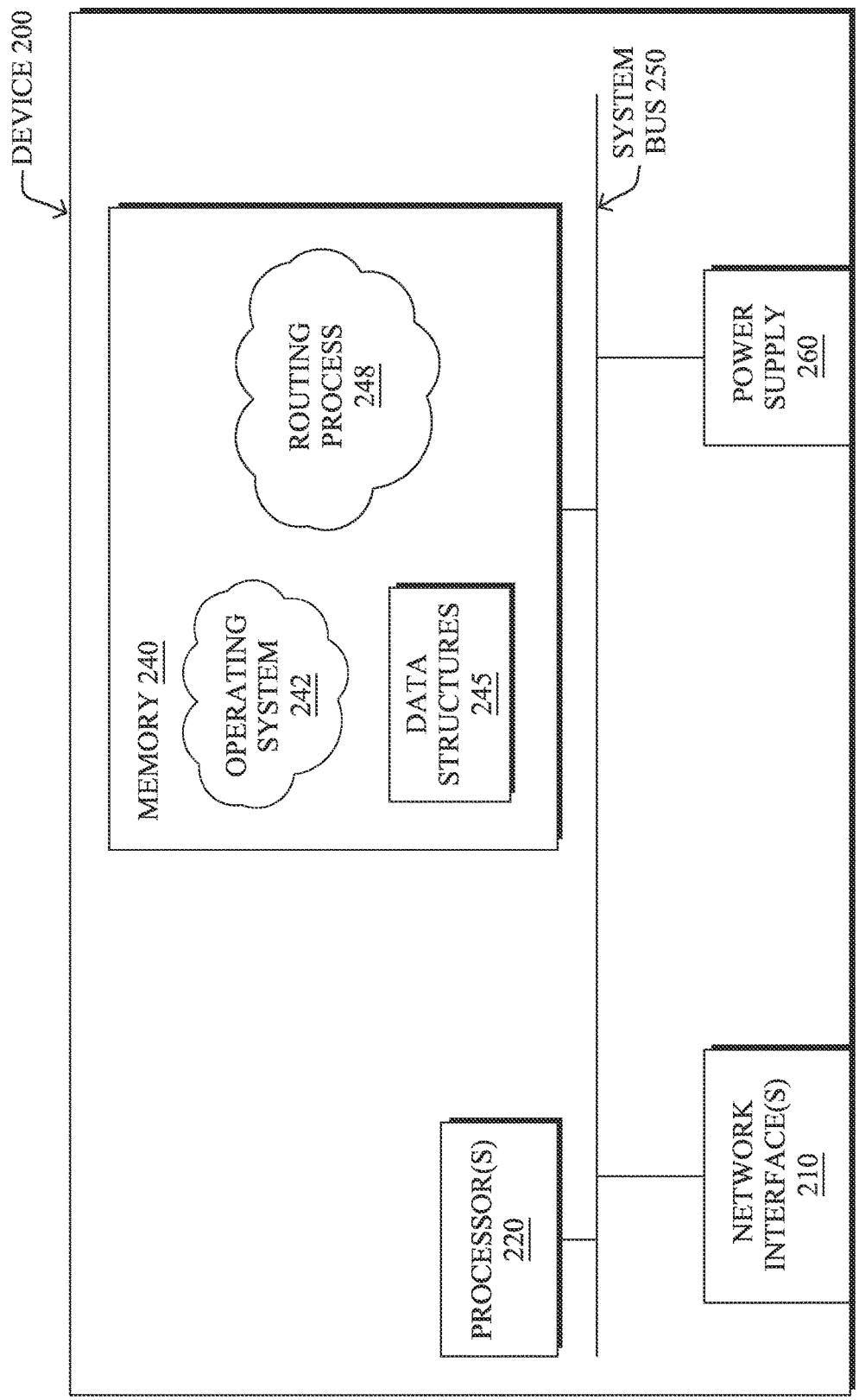
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 248 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 248 may also include computer executable instructions that, when executed by processor(s) 220, cause device 200 to predict failures of network elements in the network (e.g., a link or node/device), thereby allowing device 200 to proactively reroute traffic to avoid the failed element. To do so, in some embodiments, routing process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 248 may employ one or more supervised, unsupervised, or semi-supervised machine learning models. Generally, supervised learning entails the use of a training set of data, as noted above, that is used to train the model to apply labels to the input data. For example, the training data may include sample network telemetry that has been labeled as indicative of a network element failure, such as failure of a link or node/device, or indicative of normal operation. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior. Semi-supervised learning models take a middle ground approach that uses a greatly reduced set of labeled training data.

Example machine learning techniques that routing process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted that a network element will fail. Conversely, the false negatives of the model may refer to the number of times the model predicted normal network element operations, when the network element actually fails. True negatives and positives may refer to the number of times the model correctly predicted whether a network element will perform normally or will fail, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, failure detection in a network has traditionally been reactive, meaning that the failure must first be detected before rerouting the traffic along a secondary (backup) path. This is true, not only for IP and MPLS networks, but also for optical networks (with protection and restoration) such as SONET and SDH networks. Typically, failure detection leverages either explicit signaling from the lower network layers (e.g., optical failures signaled to the upper layers) or using a keep-alive mechanism that sends probes at some interval T that must be acknowledged by a receiver (e.g., a tunnel tail-end router). For example, routing protocols such as Open Shortest Path First (OSPF) and Intermediate System to Intermediate System (ISIS) use keep-alive signals over routing adjacencies or MPLS traffic engineering (TE) tunnels. Protocols such as Bidirectional Forwarding Detection (BFD) also make use of keep-alive mechanisms.

Traditionally, failure detection in an SD-WAN has relied on the keep-alive mechanisms of BFD over tunnels, such as IPSec tunnels. When the BFD signaling times out, the tunnel is flagged as failed and traffic is rerouted onto another tunnel. While this approach does help to mitigate the effects of the failure, the reactive nature of this approach also means that at least some of the traffic will be lost.

Figure 3:
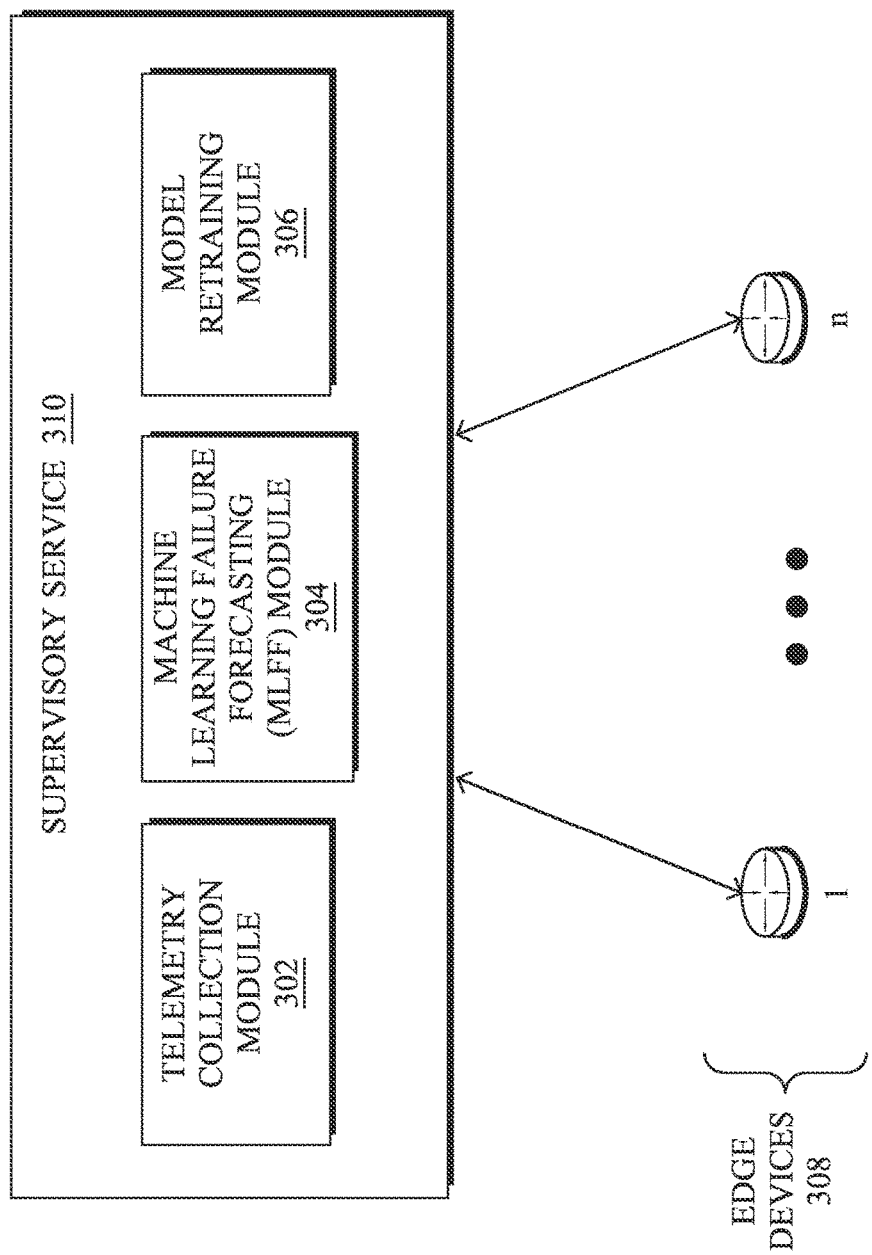
FIG. 3 illustrates an example architecture for predicting failures in a network.

FIG. 3 illustrates an example architecture 300 for predicting failures in network, according to various embodiments. In general, architecture 300 may include a supervisory service 310 located in the cloud or implemented locally in the network under scrutiny, such as a supervisory service for an SD-WAN. As shown, supervisory service 310 may include the following components: a telemetry collection module 302, a machine learning failure forecasting (MLFF) module 304, and/or a model retraining module 306. These components 302-306 may be implemented in a distributed manner or implemented as their own stand-alone services, either as part of the network under observation or as a remote service. In addition, the functionalities of the components of architecture 300 may be combined, omitted, or implemented as part of other processes, as desired.

Supervisory service 310 may be in communication with any number of devices 308 (e.g., a first through $n^{th}$ device), which may be CE routers 110 and/or PE routers 120, described previously, or other forms of networking devices configured to convey traffic through the network. In various embodiments, devices 308 may be part of the same SD-WAN or, in cases in which supervisory service 310 is implemented as a cloud-based service, part of any number of different SD-WANs or other networks.

In general, there are many circumstances in a network that can lead to failures in various areas of the network between a head-end and tail-end router (e.g., between routers 110, etc.). An objective of MLFF 304, as detailed below, is to learn early signs (networking behavioral) that have some predictive power, allowing the model to predict/forecast a tunnel failure or a failure of a network element supporting the tunnel. It is expected that some failures are predictable (i.e., there exist early signs of an upcoming failure) while others will not be non predictable (e.g., fiber cut, router crash, etc.). More specifically, almost all failures exhibit early signs, but those signs may appear only a few milliseconds (or even nanoseconds), prior to the failure (e.g. fiber cut), thereby making forecasting an almost impossible task. Some non-predictable failures may be due to the absence of signaling back to the device 308 involved and may be localized to the core of the service provider network (e.g., the underlying IP, 4G, 5G, etc. network), in which case the failure is non-predicable from the perspective of the device 308.

A first aspect of architecture 300 relates to telemetry collection module 302 obtaining the telemetry data required for model training by MLFF module 304. As used herein, the term 'relevant telemetry' refers to a telemetry measurement variable with predictive power to predict failures, which can be determined dynamically by MLFF module 304. Indeed, failures may be predictable, yet not successfully predicted, due to a lack of relevant telemetry, the inability of the model to predict the failure, or the telemetry is sampled at too coarse of a time granularity. In some embodiments, to obtain relevant telemetry from devices 308, supervisory service 310 may send a custom request to one or more of devices 308 with the objective of obtaining the list of events of interest along with the set of candidate telemetry variables with potential predictive power to predict failures. In further embodiments, devices 308 may instead provide the telemetry data to supervisory service 310 on a push basis (e.g., without service 310 first requesting the telemetry data).

In various embodiments, telemetry collection module 302 may adjust the set of telemetry variables/parameters obtained from the device(s) 308 and/or their sampling frequency. If, for example, MLFF module 304 determines that a particular telemetry variable has a strong predictive power (according to the feature importance, Shapley values, etc.), the frequency at which such a variable may be gathered may be higher compared to a variable with lower predictive power. MLFF module 304 may also determine the predictive power of a particular telemetry variable by assessing the conditional probabilities involved, in further embodiments.

MLFF module 304 may also select the set of most relevant telemetry variables. In turn, telemetry collection module 302 may request that devices 308 measure and send these variables to supervisory service 310 periodically, since real-time variations of such telemetry is needed for forecasting failure events. For example, based on the above conclusion, MLFF module 304 may determine that the CPU and memory utilizations of one or more networking devices that support a given tunnel should be sent periodically (e.g., every 1 second) by devices 308.

Other telemetry variables, such as during a rekey failure when a device 308 is not able to successfully exchange the security keys with the controller, may also be requested to be sent to supervisory service 310, on occurrence of the event. Since such events are rare and the states of the variables remain the same for longer periods of time, telemetry collection module 302 may request an event-based push request, rather than periodic messages. In other words, telemetry collection module 302 may instruct one or more of devices 308 to report certain telemetry variables only after occurrence of certain events. For example, Table 1 below shows some example telemetry variables and when a device 308 may report them to supervisory service 310:

TABLE 1

| Relevant Telemetry | Request Type |
| --- | --- |
| Memory_utilization | Requested from head and tail edge |
| CPU Utilization | routers. |
| BFD Probe Latency, Loss and Jitter | Periodically once every 1 second. |
| Queue statistics (%-age drops for different queues) | |
| Interface down event | Requested from both head and tail edge |
| Rekey exchange failure | routers |
| Router crash logs | Upon event occurrence. |

In a further embodiment, MLFF module 304 may also attempt to optimize the load imposed on the device(s) 308 reporting the telemetry variables to supervisory service 310. For example, MLFF module 304 may determine that the CPU and memory usages should be measured and reported every minute to supervisory service 310.

A key functionality of MLFF module 304 is to train any number of machine learning-based models to predict network element failures. Preferably, the models are time-series models trained centrally (e.g., in the cloud) using the telemetry collected by telemetry collection module 302. In one instantiation of MLFF module 304, the models may be trained on a per network instance or per-SD-WAN basis. Testing has shown that model performance may be influenced by parameters specific to a given network instantiation, thus promoting an implementation whereby MLFF module 304 trains a model for a specific network deployment. In further embodiments, MLFF module 304 may even train certain models on a per-tunnel basis. Although such an approach may be of limited scalability, it may be highly valuable for tunnels carrying a very large amount of potentially very sensitive traffic (e.g., inter-cloud/data center traffic).

As pointed out earlier, with current reactive routing approaches, recall (i.e., the proportion of failures being successfully predicted) is simply equal to 0, since rerouting is always reactive. In other words, the system reacts a posteriori. As a result, any recall >0 is a significant gain. One performance metric that MLFF module 304 may consider is the maximum recall (Max_Recall) achieved by the model given a precision >P_Min. For example, MLFF module 304 may evaluate the variability of Max_Recall across datasets, should a single model be trained across all datasets, to determine whether an SD-WAN specific or even a tunnel specific model should be trained.

In various embodiments, MLFF module 304 may dynamically switch between per-tunnel, per-network/SD-WAN, and global (multiple SD-WAN) approaches to model training. For example, MLFF module 304 may start with the least granular approach (e.g., a global model across all networks/SD-WANs) and then evaluate the performance of the global model versus that of per-customer/SD-WAN models. Such model performance comparison could be easily evaluated by comparing their related precision-recall curves (PRCs)/area under the curve (AUCs), or the relative Max_Recall, given that Precision >P_min.

In some cases, MLFF module 304 may employ a policy to trigger per-customer/SD-WAN specific model training, if the Max_Recall value improvement is greater than a given threshold. In another embodiment, a similar policy approach may be used to specifically require a dedicated model for a given tunnel according to its characteristic (between router A and router B), the type of traffic being carried out (e.g., sensitive traffic of type T, etc.), or the performance of the global or SD-WAN specific model for that tunnel. In such a case, the devices 308 may be in charge of observing the routed traffic and, on detecting a traffic type matching the policy, request specific model training by MLFF module 304, to start per-tunnel model training for that tunnel.

Prototyping of the techniques herein using simple models and input features based on coarse telemetry, such as 1-minute averages of loss, latency, jitter, traffic, as well as CPU/memory of CE routers, lead to recalls in the range of a few percent with a precision of 80% or more. More advanced time-series models, such as long short-term memories (LSTMs), especially with attention mechanisms, will achieve even better performance. More importantly, using richer and more fine-grained telemetry is an important driver of the forecasting performance.

Once MLFF module 304 has trained a prediction model, different options exist for its inference location (e.g., where the model is executed to predict failures). In a first embodiment, model inference is performed centrally (in the cloud), thus co-located with the model training. In such a case, once MLFF module 304 identifies the set of telemetry variables with predictive power (used for prediction), telemetry collection module 302 may send a custom message to the corresponding device(s) 308 listing the set of variables along with their sampling/reporting frequencies. Note that sampling is a dynamic parameter used by MLFF module 304 computed so as to optimize the PRC of the model against the additional overhead of the device 308 pushing additional data to the cloud (and also generating additional logging of data on the router).

In another embodiment, MLFF module 304 may push the inference task, and the corresponding prediction model, to a specific device 308, so that the prediction is preformed on-premise. Such an approach may be triggered by the frequency of sampling required to achieve the required model performance. For example, some failure types are known to provide signal a few seconds, or even milliseconds, before the failure. In such cases, performing the inference in the cloud is not a viable option, making on-premise execution of the model the better approach. Inference/model execution is usually not an expensive task on premise, especially when compared to model training. That being said, it may require fast processing on local event with an impact on the local CPU. In yet another embodiment, some models may be executed on premise, if the local resources on the router/device 308 are sufficient to feed the local model.

Thus, in some cases, the techniques herein support centralized model training (e.g., in the cloud), combined with the ability to perform local (on-premise) inference based on the required sampling frequency, local resources available on the device 308, as well as the bandwidth required to send the telemetry for input to a model in the cloud. For example, one failure prediction model may require a slow sampling rate but a large amount of data, due to a high number of input features with predictive power. Thus, reporting these telemetry variables to the cloud for prediction may consume too much WAN bandwidth on the network. In such a case, MLFF module 304 may take this constraint into account by evaluating the volume of required telemetry, according to the sampling frequency, and the WAN bandwidth allocated on the network for the telemetry traffic. To that end, MLFF module 304 may analyze the topology of the network and the available bandwidth for telemetry reporting (e.g., according to the QoS policy). If the bandwidth available for the telemetry used for the inference of the model exceeds the capacity, MLFF module 304 may decide to activate a local inference by pushing a prediction model to one or more of devices 308.

In yet another embodiment, MLFF module 304 may take a mixed approach whereby some of devices 308 perform the inferences locally, while others rely on supervisory service 310 to perform the predictions.

A further embodiment of the techniques herein introduces a feedback mechanism whereby feedback regarding the predictions by a trained model is provided to model retraining module 306. In cases in which the model is executed on device 308, the device 308 may report the rate of false positives and/or false negatives to model retraining module 308. Optionally, the reporting can also include additional context information about each false positive and/or false negative, such as the values of the telemetry variables that led to the incorrect prediction. If the performance of the model is below a designated threshold, model retraining module 306 may trigger MLFF module 304 to retrain the model, potentially increasing the granularity of the model, as well (e.g., by training a tunnel-specific model, etc.). In cases in which MLFF module 304 trains multiple prediction models, model retraining module 306 may evaluate the performance of each model and, based on their performances, decide that a particular one of the models should be used. Such an approach allows MLFF module 304 to dynamically switch between models, based on the data pattern currently being observed.

When failures are predicted in the cloud by supervisory service 310, model retraining module 306 may similarly receive feedback from devices 308 regarding the predictions. For example, once a model M predicts the failure of a tunnel at a given time, MLFF module 304 may send a notification to the affected device 308 indicating the (list of) tunnel(s) for which a failure is predicted, along with the predicted time for the failure, and other parameters such as the failure probability $P_f$ (which can be a simple flag, a categorical variable (low, medium, high) or a real number). The device 308 may use $P_f$ to determine the appropriate action, such as pro-actively rerouting the traffic that would be affected by the failure onto a backup tunnel. In one embodiment, the predicted failure may be signaled to the device 308 using a unicast message for one or more tunnels, or a multicast messages signaling a list of predicted failure to a set of devices 308.

Regardless of how model retraining module 306 receives its feedback, either from the device 308 executing the prediction model or from MLFF module 304 executing the model, model retraining module 306 may dynamically trigger MLFF module 304 to retrain a given model. In one embodiment, the model re-training may be systematic. In another embodiment, upon reaching a plateau in terms of improvement for Max_Recall or Max_Precision, model retraining module 306 may reduce the frequency of the model training.

Figure 4A:
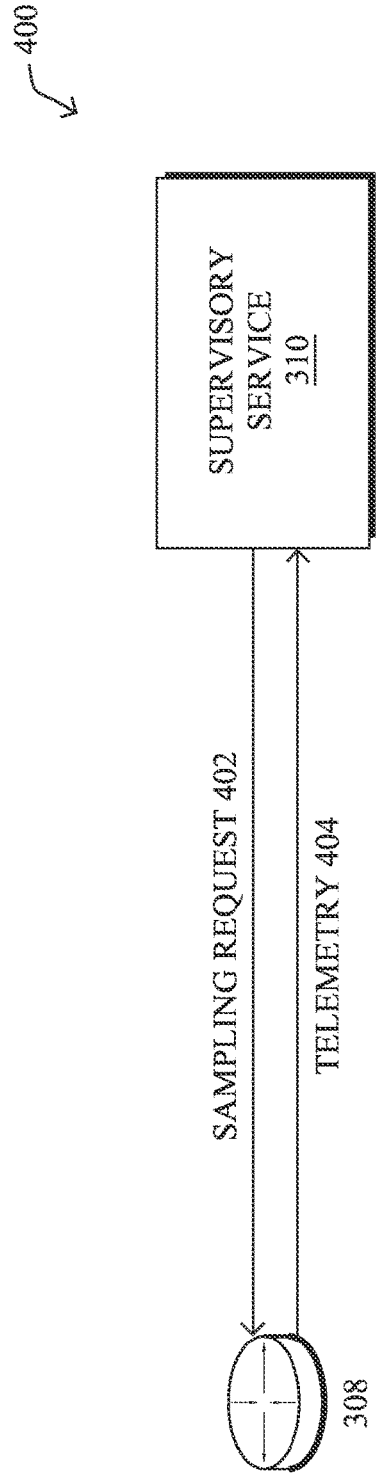
FIGS. 4A-4C illustrate examples of feedback for failure predictions.
Figure 4B:
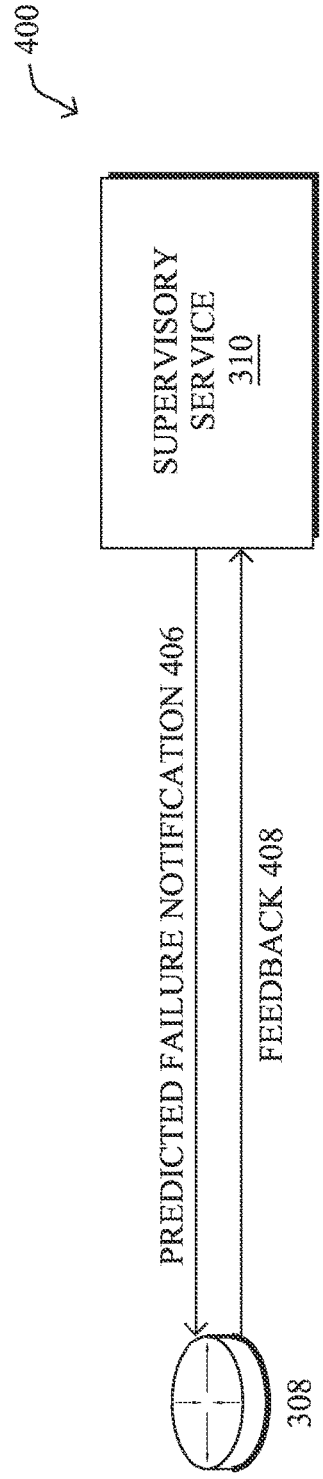
Figure 4C:
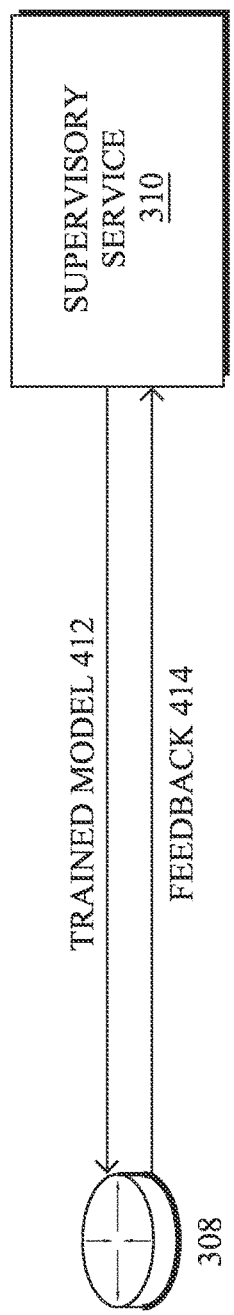

FIGS. 4A-4C illustrate examples of feedback for failure predictions, in various embodiments. As shown in example implementation 400 in FIGS. 4A-4B, assume that the trained model is executed in the cloud by supervisory service. In such a case, supervisory service 310 may send a sampling request 402 to a device 308 that indicates the telemetry variables to sample and report, as well as the determined sampling/reporting period(s) for those variables. In turn, device 308 may report the requested telemetry 404 to supervisory service 310 for analysis. For example, supervisory service 310 may request that device 308 report is CPU load every minute to supervisory service 310, to predict whether the tunnel associated with device 308 is predicted to fail. More specifically, supervisory service 310 may use telemetry 404 as input to its trained prediction model, to determine whether telemetry 404 is indicative of a failure that will occur in the future.

When supervisory service 310 determines that a failure of a network element is predicted, it may send a predicted failure notification 406 to device 308 that identifies the element predicted to fail, the time at which the failure is expected to occur, and potentially the probability of failure, as well. Depending on the timing and probability of failure, device 308 may opt to reroute the affected traffic, or a portion thereof. In turn, device 308 may monitor the element predicted to fail and provide feedback 408 to supervisory service 310 indicating whether the element actually failed and, if so, when. Supervisory service 310 can then use feedback 408 to determine whether model retraining should be initiated, such as by training a more granular model for the SD-WAN instance or the specific tunnel or path under scrutiny.

FIG. 4C illustrates an alternate implementation 410 in which supervisory service 310 pushes the failure prediction model to device 308 for local/on-premise inference. For example, supervisory service 310 may opt for device 308 to perform the local inferences, such as when model 412 requires too much bandwidth to send the needed telemetry to supervisory service 310 for cloud-based prediction. In turn, device 308 may use the corresponding telemetry measurements as input to trained model 412 and, if a failure is predicted, perform a corrective measure such as proactively rerouting the traffic to one or more other tunnels or other paths. In addition, device 308 may provide feedback 414 to supervisory service 310 that indicates false positives and/or false negatives by the model. For example, if device 308 reroutes traffic away from a element predicted by model 412 to fail, and the tunnel does not actually fail, device 308 may inform supervisory service 310. Supervisory service 310 may use feedback 414 to determine whether model 412 requires retraining, such as by adjusting which telemetry variables are used as input to the model, adjusting the granularity of the training (e.g., by using only training telemetry data from the tunnel, etc.), or the like.

As noted above, predictive routing in SD-WANs represents an evolution over traditional reactive routing, allowing the network to address problems before they actually occur. To do so, the predictive routing mechanism will need to answer questions of the type "what would happen to X if Y happened?" For instance, in predictive routing, the routing mechanism needs to not only anticipate that a primary link may go down, but also ensure that the path used as a backup will meet the service level agreement (SLA) needs of the traffic, with the extra overhead of the redirected traffic on the tunnel. Another example relates to adding more traffic (or more users) to predict the joining times in a Wi-Fi network. The general framework that answers this question is called a "what-if scenario." In this specific case, the question can be formulated as "what would happen to the SLA if the traffic were redirected from tunnel A to tunnel B?"

The challenge to train a model for predictive routing is the collection of relevant data for such what-if scenarios. Historically, simulations and mathematical models built from first principles have been used in an attempt to answer such what-if questions in a network. But, in many cases, simulations turned out to be impossible because of the complexity of physical phenomenon or simply the lack of understanding of system dynamics, which is particularly true in the case of SD-WANs.

Adaptive Stress Testing of SD-WAN Tunnels for What-If Scenario Model Training

The techniques herein propose using a machine learning model that empirically learns the mapping between parameters of interest (e.g., traffic patterns, etc.) to metrics of interest (e.g., the SLA on the link). More specifically, in the case of SD-WANs, the techniques herein introduce a system that actively generates or diverts traffic onto a backup link/tunnel, to train and validate a what-if assessment model, thus achieving two goals at once. In doing so, the system enables the creation of both training and validation data for what-if assessment and training.

Specifically, according to one or more embodiments herein, a service in a network computes an expected information gain associated with rerouting traffic from a first tunnel onto a backup tunnel in the network. The service initiates, based on the expected information gain, rerouting of the traffic from the first tunnel onto the backup tunnel. The service obtains performance measurements for the traffic rerouted onto the backup tunnel. The service uses the performance measurements to train a machine learning model to predict whether rerouting traffic from the first tunnel onto the backup tunnel will satisfy a service level agreement (SLA) of the traffic.

Illustratively, the techniques described herein may be performed by hardware, software, and/or firmware, such as in accordance with the routing process 248, which may include computer executable instructions executed by the processor 220 (or independent processor of interfaces 210) to perform functions relating to the techniques described herein.

Figure 5:
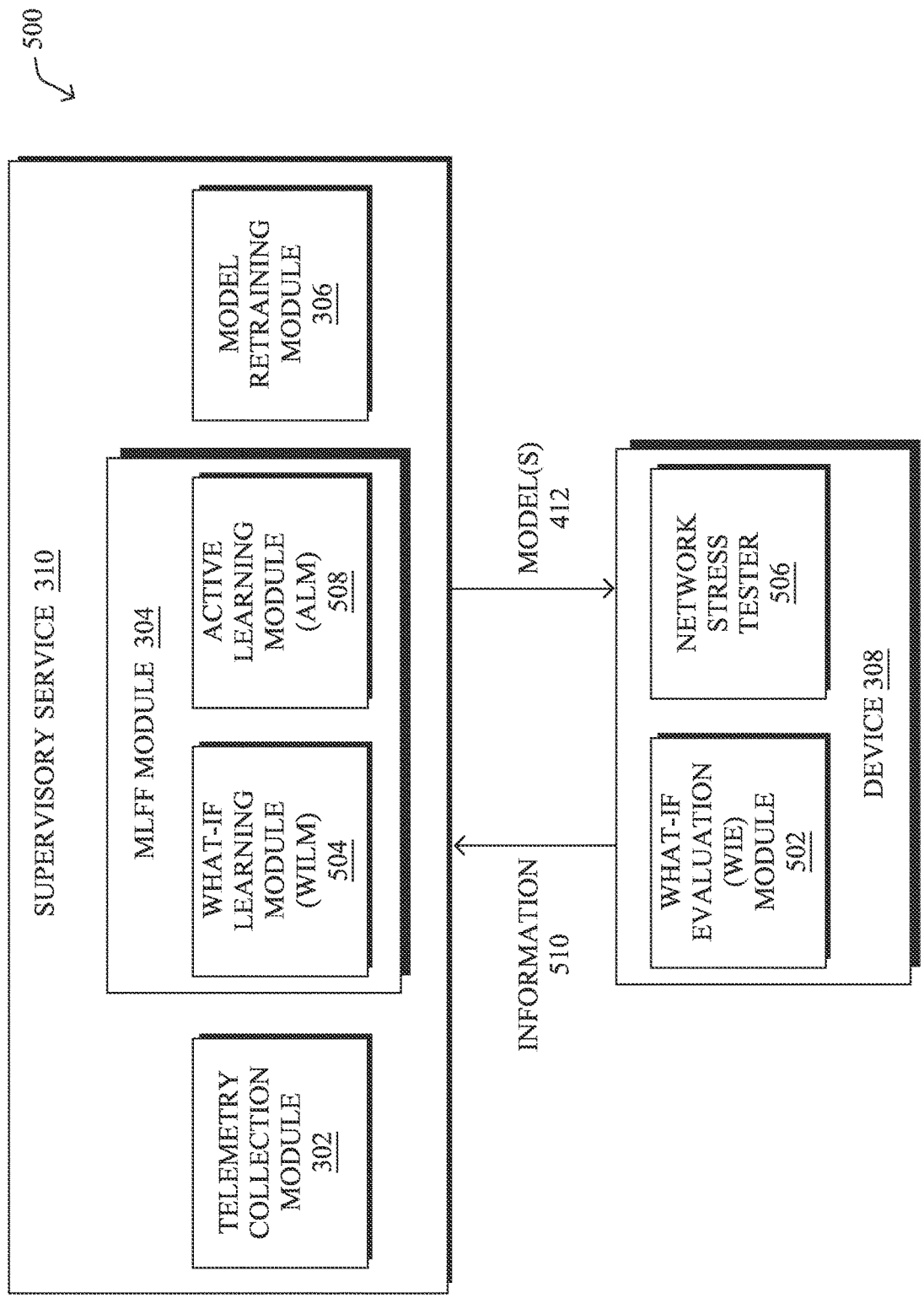
FIG. 5 illustrates an example architecture for adaptive stress testing of tunnels for what-if scenario model training.

Operationally, FIG. 5 illustrates an example architecture 500 for adaptive stress testing of tunnels for what-if scenario model training, according to various embodiments. Continuing the example of FIG. 3, architecture 500 may include any or all of the components of architecture 300 with the following additions, to provide a service to the network: a what-if evaluation (WIE) module 502, a what-if learning module 504, a network stress tester 506, and/or an active learning module 508. As would be appreciated, the various components shown may be combined or omitted, as desired. Further, these components can be executed either locally on a particular device or implemented in a distributed manner, in various cases.

As shown, what-if evaluation (WIE) module 502 may be configured to predict the SLA of various (critical) applications for a backup link/tunnel, given an increase in overhead on the backup that is attributable to rerouting traffic from another link/tunnel onto the backup. In a further embodiment, WIE module 502 may also be configured to predict the SLA on the current link/tunnel, should traffic be increased on that link/tunnel, such as when new traffic is added. Typically, WIE module 502 may be executed locally on a device 308, such as an edge router, to allow the router to proactively reroute traffic away from its current tunnel, before that tunnel can no longer meet the SLA of the traffic (e.g., when the tunnel is predicted to fail, when the performance of the tunnel is predicted to degrade, etc.). However, further embodiments provide for WIE module 502 to be executed on another device and its predictions sent to device 308, as needed.

More formally, given a target variable Y, WIE module 502 may model the influence of a series of influencing variables $X=[X_1, X_2, \ldots, X_N]$ that can be constrained according to the scenario of interest. For instance, assuming Office365 and voice traffic is given by the variables $X_1$ and $X_2$, respectively, and that a link A carries $D_1$ and $D_2$ kbps of such traffic, WIE module 502 may predict the SLA, given by the target variable Y, for link B with the constraint that X is unchanged, except for $X_1$ and $X_2$, which should be set to $X_1+D_1$ and $X_2+D_2$, respectively. Additional variables describing the traffic can also be used by WIE module 502. For instance, other variables can reflect the number of packets per second, as well as any other traffic characteristic that may impact tunnel utilization and performance.

Generally, WIE module 502 may estimate the values for the $D_i$ variables based on recent historical statistics of the primary tunnel. For example, if the average throughput for the $i^{th}$ application (e.g., Office365, voice, etc.) over the last half-hour has been 200 kbps, then $D_i$ may be set to that value. In certain cases, WIE module 502 may also account for the uncertainty and/or variability of the value $D_i$ and build an ensemble of such vectors, in order to have a realistic picture of the possible scenarios.

In some embodiments, WIE module 502 may represent the traffic of the primary tunnel as a probability distribution, considering various variations. For example, in the previous case above, WIE module 502 may collect instantaneous throughput values for Office365 traffic over the last half-hour, to build an empirical probability distribution representing the traffic for that application. If there is a lot variability in the traffic, this may be a more precise representation of the traffic that will need to be handled by the backup tunnel rather than a single point estimate such as the mean or max would be.

The role of WIE module 502 is then to estimate the SLA for the backup tunnel when charged with traffic described by that probability distribution. In various embodiments, WIE module 502 achieves this using one or more machine learning models. In one embodiment, the model is trained in the cloud (e.g., by supervisory service 310), based on information 510 pushed by the various edge devices 308. Regularly, the machine learning model is re-trained, either from scratch or incrementally, and the updated model, such as model 412) is pushed back to the WIE module 502 on each of the edge devices. Optionally, WIE module 502 can carry out additional training steps, starting out from the general model pushed from the cloud. This is usually referred to as "fine-tuning" in the machine learning literature and can allow the local model on device 308 to be personalized to the fine-grained patterns specific to edge device 308.

The nature of the tunnel, as well as the network configuration, are essential to predicting the SLA under various traffic conditions. To this end, WIE module 502 on each edge device, such as device 308, may report the following information 510 to supervisory service 310 for machine learning model training:

The traffic conditions X described above, at regular time steps and for each tunnel.

The corresponding observed SLAs Y, at regular time steps and for each tunnel.

Contextual information C about the edge device and each of the tunnels.

The contextual information in information 510 includes information about configuration on the edge device 308 (e.g., routing, QoS), as well as on each of the tunnels, such as the type of the transport, corresponding ISP, geographical locations of the endpoints, information about the amount of bandwidth provisioned with the ISP when available, etc. As would be appreciated, C is a critical aspect of the techniques herein. Indeed, in many circumstances, the model used to predict outcomes for 'what-if is scenarios' is highly dependent on the context. For example, consider the case of a Service Provider (SP) providing Internet connectivity. Typically, SPs adopt different strategies in terms of network engineering, over-booking ratios, QoS mechanisms, policy enforcement, and the like. Thus, providing the context as part of information 510 is critical for the training of an accurate model 412, and such context will be used as feature inputs to what-if learning module 504.

As shown, what-if learning module (WILM) 504 receives information 510 pushed by the WIE modules 502 on the edge device(s) 308, trains the machine learning models (e.g., model 412), and pushes the trained models to the edge device(s) 308 for use by the WIE modules 502. In its simplest embodiment, the WILM 504 trains a machine learning model 412 that directly predicts the output required by WIE module 502. For example, WILM 504 may trains model 412 to predict SLA violations for different applications. A large range of statistical and machine learning models can be used: linear or kernelized models, tree-based models such as gradient boosted regression trees (GBRTs) or Random Forests, or higher capacity models such as neural networks. Generally, most methods amenable to regression or classification can be used, although it is best if the model 412 allows deriving uncertainty estimates for use by active learning module 508, detailed below, such as Bayesian methods (e.g., Gaussian processes, etc.). More formally, WILM 504 trains the model(s) 412 using $(X_t, C_t)$ as feature vectors, and $Y_t$ as target values.

Many of the contextual features in information 510 are categorical. For instance, the SP or geographical regions of the tunnel endpoints. These can be treated by WILM 504 using an approach such as one-hot encoding. However, this fails to capture the structure and relationships between the modalities. In a further embodiment, WILM 504 may instead use ad-hoc modeling for each such feature (e.g., weight sharing, structured sparsity).

To tune and adjust model(s) 412, WILM 504 may split information 510 into different dataset such as a training dataset, a testing dataset, and/or a validation dataset. Because of the temporal nature of this data, random splits can lead to contamination and specific splitting strategies should be used by WILM 504. In one embodiment, WILM 504 may designate the most recent data from information 510 for testing and validation. In another embodiment, WILM 504 may hold out information 510 for certain specific tunnels, possibly using stratified samples of variables such as ISP, location and nature of the tunnel/transport, etc. Both techniques can also be combined, in a further embodiment.

In various embodiments, architecture 500 may also include a network stress tester 506 configured to detect the boundary condition in which the answer to the 'what-if scenario' changes. For example, in the case of SD-WANs, the boundary condition may be when the tunnel fails to meet the SLA. To do so, in one embodiment, network stress tester 506 may periodically send increasingly larger amounts of traffic to the tail-end router, while measuring key metrics such as loss, latency, and jitter of BFD probes or other protocols such as RTCP or IP SLA. In turn, network stress tester 506 can report these obtained performance metrics to WILM 504 for model training. The goal here is to explore and eventually allow the trained model 412 of WIE module 502 to model the behavior of the tunnel, subject to increased amounts of traffic of different types. During such tests, network stress tester 506 carefully monitors the SLA of the tunnel and immediately stops the test when a degradation appears. In other words, the role of network stress tester 506 is to identify the boundary between normal, healthy traffic and an overloading of the tunnel. In order to improve the predictions by WIE module 502, its training dataset can be augmented with data points that lie beyond the identified boundary and labeled as SLA violations.

Network stress tester 506 may also monitor a set of QoS parameters used to reflect the application experience in real-time. Such a mechanism may only be employed by network stress tester 506 during times of testing. For example, when conducting a stress test of a tunnel, network stress tester 506 may also monitor the per-queue packet drops, waiting times, etc., along with action potential variables present in data and control plane traffic (e.g., RTP, RTCP statistics, change of encoding techniques in video streams, etc.). If network stress tester 506 detects a sudden change in one or more of these variables, it may stop the stress test. This detection can be achieved by network stress tester 506 using statistical derivatives, anomaly detection, or the like.

As would be appreciated, existing stress testing solutions tend to test tunnels by flooding traffic during time periods of low traffic loads (e.g., late at night), to measure the capacity of a tunnel. For purposes of training a what-if model, though, doing so does not yield very useful information, as it is not representative of the expected performance of the tunnel during busy hours. In contrast, the adaptive stress testing approach taken by network stress tester 506 allows for stress testing tunnels with additional loads at any time, while still ensuring that the 'normal' traffic on the tunnel is not adversely affected.

Figure 6A:
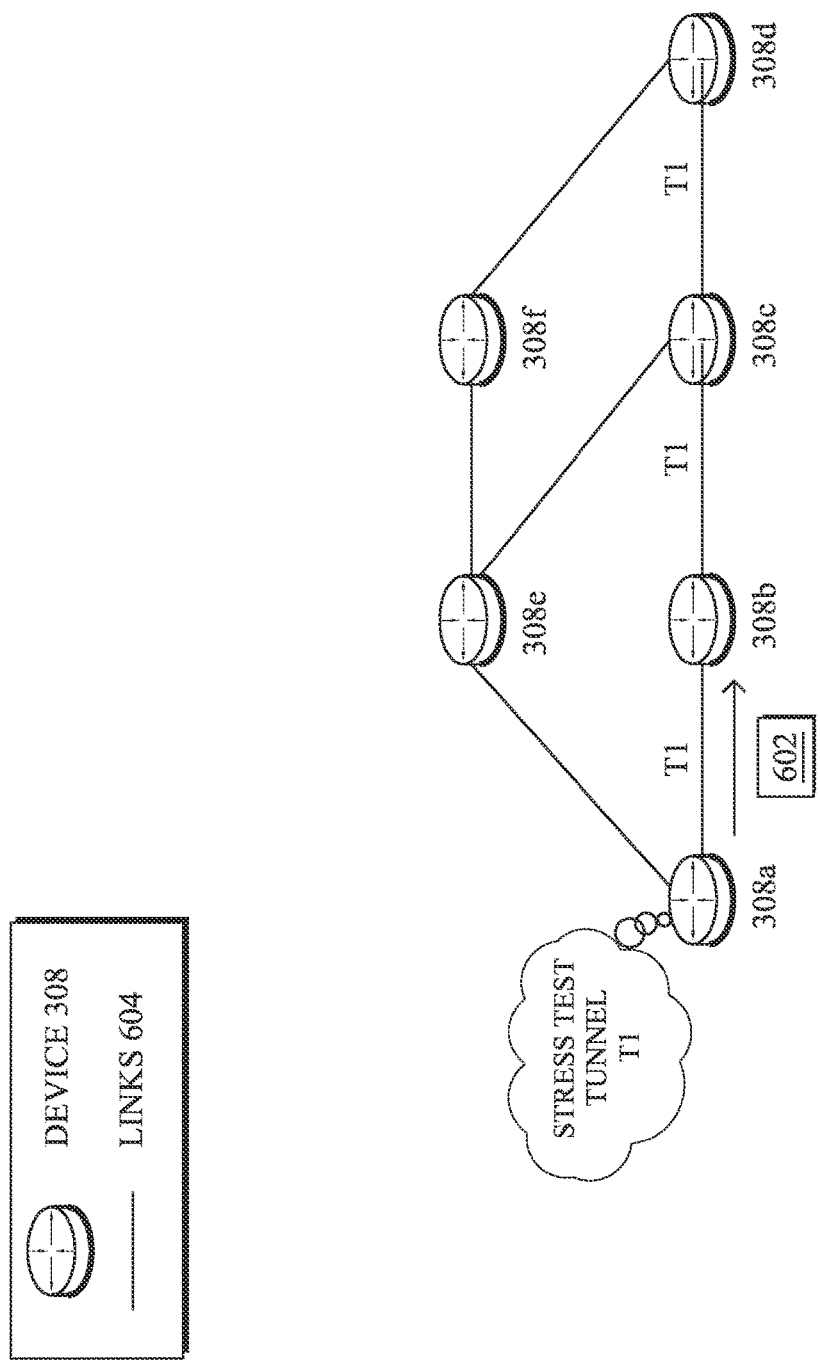
FIGS. 6A-6B illustrate examples of stress testing in a network.

By way of example, consider the case of FIG. 6A in which a plurality of devices 308a-308f are interconnected by links 604 and a tunnel T1 connects a head-end device 308a with a tail-end device 308d. To perform a stress test on tunnel T1, device 308a may increase the traffic 602 sent to device 308d via tunnel T1 and gather the resulting performance metrics (e.g., via BFD signaling, etc.). If, as a result of this monitoring, device 308a determines that the SLA of the traffic on T1 is no longer being met, or if the QoS of the application is not being met, it may end the stress test, so as not to impinge on the legitimate traffic sent via tunnel T1.

Referring again to FIG. 5, in a further embodiment, the adaptive stress testing approach taken by network stress tester 506 can also be extended to Wi-Fi networks. For example, stress testing of a Wi-Fi network can be achieved by simulating multiple users using multiple connections on different links, to estimate the throughput degradation. The connection may be simulated from one access point (AP) to another and the ability to communicate between APs is already available in certain APs, such as Cisco 4800 APs.

Figure 6B:
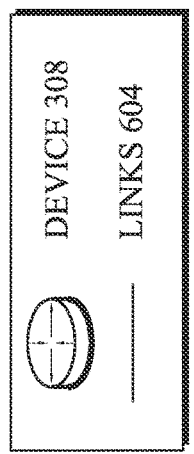
Figure 6B:
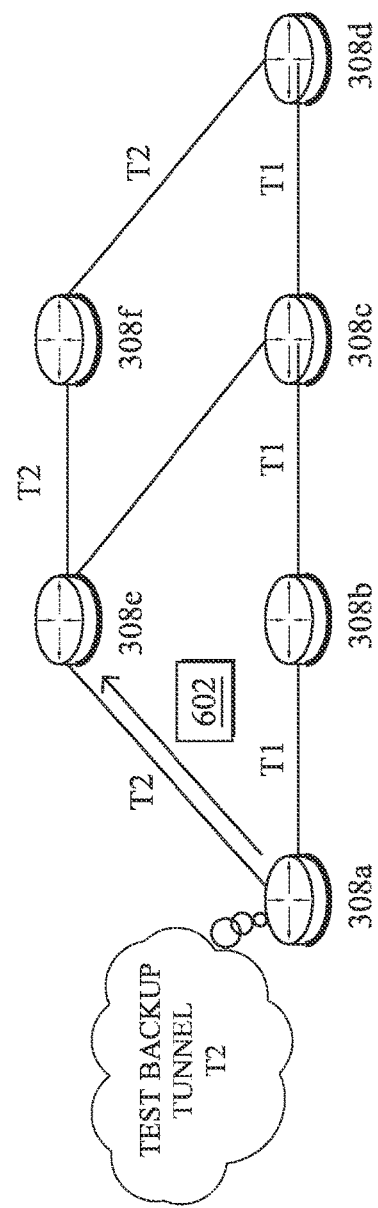

In another embodiment, network stress tester 506 may divert real traffic from the primary tunnel to backup tunnels, in order to obtain training data for model 412 of WIE module 502. In this situation as well, network stress tester 506 may aggressively monitor the SLA and/or QoS metrics of the backup tunnel and immediately stop adding more load to the backup tunnel, if the metrics become too dire. For example, as shown in FIG. 6B, assume that there exists a backup tunnel T2 that connects devices 308a and 308d and serves as a backup for the primary tunnel T1. In such a case, device 308a may redirect at least a portion of traffic 602 onto tunnel T2, to monitor the effects of this rerouting. If the results of this testing indicate a negative impact on traffic 602, device 308a may conclude the test and return traffic 602 to its primary tunnel T1. Since this stress testing is exploratory in nature, the goal is to be very cautious.

Referring yet again to FIG. 5, a further component of architecture 500 may be active learning module (ALM) 508, which is configured to drive the collection of training data (e.g., information 510) for model 412 of WIE module 502. In particular, ALM 508 needs to solve an exploration-exploitation tradeoff: at the beginning, the predictions by WIE module 502 are highly uncertain, due to a lack of sufficient training data. Hence, ALM 508 may instruct network stress tester 506 to stress test tunnels often, either by using artificial or actual traffic, in order to train and evaluate the accuracy of model 412 of WIE module 502 on the available backup links/tunnels. To achieve this, ALM 508 may try to maximize the expected information gain (EIG) of every collected datapoint. Indeed, instead of network stress tester 506 randomly or arbitrarily testing tunnels, ALM 508 may trigger network stress tester 506 to do so only when the network conditions are such that the collected datapoints will have a high EIG. That is, the collected information 510 will contribute a lot to the training of model 412. While ALM 508 is shown as part of supervisory service 310, further embodiments provide for ALM 508 to be resident on device 308, such as in the case of retraining or local training of model 412 by device 308.

ALM 508 can compute the EIG in in a number of different ways, which lead to various possible embodiments:
- If model 412 used by WIE module 502 is a Bayesian model, ALM 508 can directly measure the EIG of a given data point by measuring the variance of the prediction provided by the model 412 for this point.
- If the model 412 used by WIE module 502 is non-Bayesian, ALM 508 may instead maintain an internal model, to compute the EIG. This internal model can take various forms such as:
  - A compressed representation of the training set (using density estimation methods), to estimate the 'amount' of training data similar to given data point (i.e., the lower the density in this area, the higher the information gain).
  - An ad-hoc regression model that maps input features of model 412 to a measure of the model uncertainty. This can be given by, for instance, the Mean Squared Error of the predictions in that region.
  - Direct estimation of the 'value' of a given point by measuring the loss reduction upon performing an incremental training step of the model 412.

When in exploration mode, ALM 508 may initiate stress testing quite often by triggering network stress tester 506 to perform stress tests at a higher frequency, even for points with relatively low EIGs. As the quality and accuracy of the predictions by WIE module 502 improve, which can also be included in information 510, ALM 508 may shift the exploration by network stress tester 506 towards testing only high-value points. This tradeoff can be optimized using Bayesian techniques that maintain probabilistic estimates of the performance, as well as a measure of the uncertainty of these estimates, given some underlying features. This type of meta-modeling is typically used in the context of automated machine learning (AutoML) to perform model, feature, and hyperparameter selection. In context here, ALM 508 can use similar techniques to model the algorithmic performance in different settings (given by a part or the entirety of X, for instance). Using this information, ALM 508 can dynamically adjust its trust in the different inputs and optimally decide when network stress tester 506 should switch the traffic over to a backup link.

In another embodiment, ALM 508 may even design specific stress tests for network stress tester 506, to optimize the EIG of a given data sample. That is, ALM 508 may instruct network stress tester 506 to either re-direct a subset of the primary link traffic and/or instruct network stress test 506, to generate a very specific mix of application traffic. This can be achieved either by applying optimization methods wherein the internal model is used to find the 'most valuable point, from an EIG standpoint and given some constraints, which depend on the current traffic profile on the primary link and/or the capabilities of network stress tester 506. Note, of course, that this active creation of relevant network conditions is possible only for 'controllable features,' such as traffic, but not for features like router model, CPU, memory, provider, etc.

Figure 7:
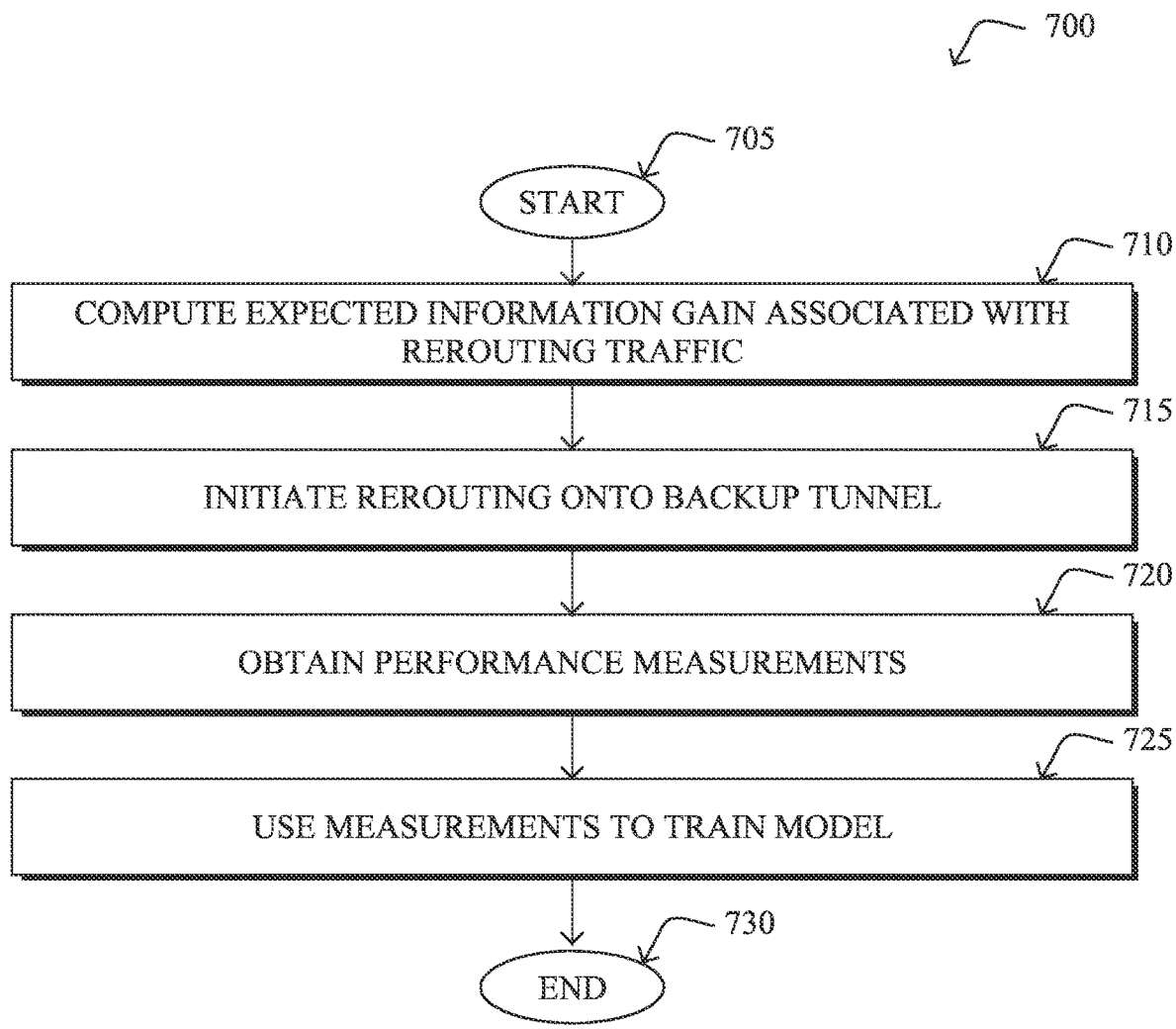
FIG. 7 illustrates an example simplified procedure for adaptive stress testing of network tunnels for what-if scenario model training.

FIG. 7 illustrates an example simplified procedure for adaptive stress testing of network tunnels for what-if scenario model training, in accordance with one or more embodiments described herein. For example, a non-generic, specifically configured device (e.g., device 200) may perform procedure 700 by executing stored instructions (e.g., process 248). The procedure 700 my start at step 705 and continue on to step 710 where, as described in greater detail above, the service may compute an expected information gain associated with rerouting traffic from a first tunnel onto a backup tunnel in the network. For example, if the model to be trained is a Bayesian model, the service may use the model to predict an outcome of rerouting the traffic from the first tunnel onto the backup tunnel and measure a variance between the predicted outcome and the obtained performance measurements. In further embodiments, if the model is non-Bayesian, the service may estimate an amount of training data for the machine learning model that was obtained under similar conditions as those associated with rerouting traffic from the first tunnel onto the backup tunnel, use an ad-hoc regression model to map input features of the machine learning model to a measure of model uncertainty, or measuring a loss reduction associated with retraining the model.

At step 715, as detailed above, the service may initiate, based on the expected information gain, rerouting of the traffic from the first tunnel onto the backup tunnel. For example, the service may instruct a network stress tester on a router or other device to reroute traffic onto a backup link or tunnel, based on an indication that doing so would yield a large information gain for purposes of model training. During such rerouting, the service may also increase an amount of the traffic rerouted onto the backup tunnel until the backup tunnel does not meet the SLA of the traffic. In doing so, the service can identify the boundary conditions for the backup tunnel, allowing for better what-if scenario predictions.

At step 720, the service may obtain performance measurements for the traffic rerouted onto the backup tunnel, as described in greater detail above. Generally, these performance measures may be captured using mechanisms such as BFD signaling, other signaling in the control and/or data planes, QoS measurements, or the like. Doing so allows the service to measure the effects of the new traffic on the backup path.

At step 725, as detailed above, the service may use the performance measurements to train a machine learning model to predict whether rerouting traffic from the first tunnel onto the backup tunnel will satisfy a SLA of the traffic. For example, assume that the traffic is video traffic with a certain SLA indicative of a maximum allowed amount of jitter. In such a case, the model may be trained using the obtained performance measurements to predict whether rerouting the video traffic onto the backup path would cause the jitter associated with the traffic to no longer meet its defined SLA. Such a mechanism allows the service to explore what-if scenarios for possible corrections, when tunnel failures and issues are predicted. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the adaptive stress testing of tunnels in a network, such as an SD-WAN, in an intelligent manner, to garner training data for what-if scenario model training. In some aspects, this training allows for the prediction of While there have been shown and described illustrative embodiments that provide for coupling reactive and predictive routing, it is to be understood that various other adaptations and modifications may be made within the spirit and scope of the embodiments herein. For example, while certain embodiments are described herein with respect to using certain models for purposes of predicting failures, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   computing, by a supervisory service in a network, an expected information gain associated with rerouting traffic from a first tunnel onto a backup tunnel in the network, wherein the expected information gain represents a degree to which information that is collected as a result of rerouting the traffic is expected to contribute to training of a machine learning model;
   determining, by the supervisory service, whether the expected information gain is greater than a predetermined level;
   initiating, by the supervisory service and based on the expected information gain being greater than the predetermined level, rerouting of the traffic from the first tunnel onto the backup tunnel, wherein the supervisory service increases an amount of traffic rerouted onto the backup tunnel over time;
   measuring, by the supervisory service, an effect of the amount of traffic rerouted onto the backup tunnel being increased over time by collecting telemetry data, from one or more devices associated with the traffic;
   training, by the supervisory service, the machine learning model using the telemetry data collected from the one or more devices to predict whether rerouting the traffic from the first tunnel onto the backup tunnel will satisfy a supervisory service level agreement (SLA) of the traffic; and
   sending, by the supervisory service, the machine learning model that has been trained to the one or more devices from which the telemetry data is collected.

2. The method as in claim 1, wherein the supervisory service is a cloud-based supervisory service.

3. The method as in claim 1, wherein the telemetry data comprises performance measurements indicative of at least one of: loss, latency, or jitter.

4. The method as in claim 1, wherein the machine learning model is a Bayesian model, and wherein computing the expected information gain associated with rerouting traffic from the first tunnel onto the backup tunnel in the network comprises:
   using the machine learning model to predict an outcome of rerouting the traffic from the first tunnel onto the backup tunnel; and
   measuring a variance between the outcome that is predicted and the telemetry data that is collected.

5. The method as in claim 1, wherein the machine learning model is a non-Bayesian model, and wherein computing the expected information gain associated with rerouting traffic from the first tunnel onto the backup tunnel in the network comprises:
   using an ad-hoc regression model to map input features of the machine learning model to a measure of model uncertainty.

6. The method as in claim 1, wherein the machine learning model is a non-Bayesian model, and wherein computing the expected information gain associated with rerouting traffic from the first tunnel onto the backup tunnel in the network comprises:
   measuring a loss reduction associated with retraining the machine learning model.

7. The method as in claim 1, wherein the machine learning model is a non-Bayesian model, and wherein computing the expected information gain associated with rerouting traffic from the first tunnel onto the backup tunnel in the network comprises:
   estimating an amount of training data for the machine learning model that was obtained under similar conditions as those associated with rerouting traffic from the first tunnel onto the backup tunnel.

8. The method as in claim 1, further comprising:
   generating, by the supervisory service, sample application traffic; and
   sending, by the supervisory service, the sample application traffic with the traffic rerouted onto the backup tunnel.

9. An apparatus, comprising:
   one or more network interfaces to communicate with a network;
   a processor coupled to the one or more network interfaces and configured to execute one or more processes; and
   a memory configured to store a process that is executable by the processor, the process when executed configured to:
      compute an expected information gain associated with rerouting traffic from a first tunnel onto a backup tunnel in the network, wherein the expected information gain represents a degree to which information that is collected as a result of rerouting the traffic is expected to contribute to training of a machine learning model;

determine whether the expected information gain is greater than a predetermined level;

initiate, based on the expected information gain being greater than the predetermined level, rerouting of the traffic from the first tunnel onto the backup tunnel, wherein the apparatus increases an amount of traffic rerouted onto the backup tunnel over time;

measure an effect of the amount of traffic rerouted onto the backup tunnel being increased over time by collecting telemetry data, from one or more devices associated with the traffic;

train the machine learning model using the telemetry data collected from the one or more devices to predict whether rerouting the traffic from the first tunnel onto the backup tunnel will satisfy a supervisory service level agreement (SLA) of the traffic; and sending, by the supervisory service, the machine learning model that has been trained to the one or more devices from which the telemetry data is collected.

10. The apparatus as in claim 9, wherein the apparatus is a cloud-based supervisory service.

11. The apparatus as in claim 9, wherein the process when executed is further configured to:

send the machine learning model that has been trained to the one or more devices from which the telemetry data is collected.

12. The apparatus as in claim 9, wherein the machine learning model is a Bayesian model, and wherein the apparatus computes the expected information gain associated with rerouting traffic from the first tunnel onto the backup tunnel in the network by:

using the machine learning model to predict an outcome of rerouting the traffic from the first tunnel onto the backup tunnel; and measuring a variance between the outcome that is predicted and the telemetry data that is collected.

13. The apparatus as in claim 9, wherein the machine learning model is a non-Bayesian model, and wherein the apparatus computes the expected information gain associated with rerouting traffic from the first tunnel onto the backup tunnel in the network by:

using an ad-hoc regression model to map input features of the machine learning model to a measure of model uncertainty.

14. The apparatus as in claim 9, wherein the machine learning model is a non-Bayesian model, and wherein the apparatus computes the expected information gain associated with rerouting traffic from the first tunnel onto the backup tunnel in the network by:

measuring a loss reduction associated with retraining the machine learning model.

15. The apparatus as in claim 9, wherein the machine learning model is a non-Bayesian model, and wherein the apparatus computes the expected information gain associated with rerouting traffic from the first tunnel onto the backup tunnel in the network by:

estimating an amount of training data for the machine learning model that was obtained under similar conditions as those associated with rerouting traffic from the first tunnel onto the backup tunnel.

16. The apparatus as in claim 9, wherein the process when executed is further configured to:

generate sample application traffic; and send the sample application traffic with the traffic rerouted onto the backup tunnel.

17. A tangible, non-transitory, computer-readable medium that stores program instructions that cause a supervisory service in a network to execute a process comprising:

computing, by the supervisory service, an expected information gain associated with rerouting traffic from a first tunnel onto a backup tunnel in the network, wherein the expected information gain represents a degree to which information that is collected as a result of rerouting the traffic is expected to contribute to training of a machine learning model;

determining, by the supervisory service, whether the expected information gain is greater than a predetermined level;

initiating, by the supervisory service and based on the expected information gain being greater than the predetermined level, rerouting of the traffic from the first tunnel onto the backup tunnel, wherein the supervisory service increases an amount of traffic rerouted onto the backup tunnel over time;

measuring, by the supervisory service, an effect of the amount of traffic rerouted onto the backup tunnel being increased over time by collecting telemetry data, from one or more devices associated with the traffic;

training, by the supervisory service, the machine learning model using the telemetry data collected from the one or more devices to predict whether rerouting the traffic from the first tunnel onto the backup tunnel will satisfy a supervisory service level agreement (SLA) of the traffic; and sending, by the supervisory service, the machine learning model that has been trained to the one or more devices from which the telemetry data is collected.

18. The tangible, non-transitory, computer-readable medium as in claim 17, wherein the supervisory service is a cloud-based supervisory service.

* * * * *

UNITED STATES PATENT AND TRADEMARK OFFICE
CERTIFICATE OF CORRECTION

PATENT NO. : 12,058,010 B2
APPLICATION NO. : 17/873414
DATED : August 6, 2024
INVENTOR(S) : Jean-Philippe Vasseur et al.

Page 1 of 1

It is certified that error appears in the above-identified patent and that said Letters Patent is hereby corrected as shown below:

In the Specification

Column 14, Line 66 should read:
predict outcomes for 'what-if scenarios' is highly depen- Signed and Sealed this
Fifth Day of November, 2024

Katherine Kelly Vidal
*Director of the United States Patent and Trademark Office*